United States Patent
Yacoub

(10) Patent No.: US 6,552,813 B2
(45) Date of Patent: *Apr. 22, 2003

(54) DIRECTING PRINT JOBS IN A NETWORK PRINTING SYSTEM

(75) Inventor: Yousef R. Yacoub, San Jose, CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/661,359

(22) Filed: Jun. 11, 1996

(65) Prior Publication Data

US 2003/0011805 A1 Jan. 16, 2003

(51) Int. Cl.[7] ............................................. G06F 15/00
(52) U.S. Cl. ....................................... 358/1.1; 358/1.15
(58) Field of Search ............................. 395/101, 112, 395/113, 114, 115, 116, 180, 181, 185.01, 185.02, 185.04, 185.05, 200.01, 200.02, 200.03, 200.14; 358/404, 406, 444, 405, 437, 407, 296; 371/47.1, 48; 399/8, 9, 10, 16, 18, 19

(56) References Cited

U.S. PATENT DOCUMENTS

| | | | | |
|---|---|---|---|---|
| 5,075,874 A | * | 12/1991 | Steeves et al. | 395/112 |
| 5,165,014 A | * | 11/1992 | Vassar | 395/112 |
| 5,220,674 A | * | 6/1993 | Morgan et al. | 395/200.53 |
| 5,228,118 A | * | 7/1993 | Sasaki | 395/112 |
| 5,287,194 A | * | 2/1994 | Lobiondo | 358/296 |
| 5,303,336 A | * | 4/1994 | Kageyama et al. | 395/114 |
| 5,371,837 A | * | 12/1994 | Kimber et al. | 395/114 |
| 5,450,571 A | * | 9/1995 | Rosekrans et al. | 395/500 |
| 5,467,434 A | * | 11/1995 | Hower, Jr. et al. | 358/1.15 |
| 5,511,149 A | * | 4/1996 | Hayano | 395/112 |
| 5,550,957 A | * | 8/1996 | Davidson, Jr. et al. | 395/114 |
| 5,559,933 A | * | 9/1996 | Boswell | 395/114 |
| 5,625,757 A | * | 4/1997 | Kageyama et al. | 395/113 |

OTHER PUBLICATIONS

IBM Technical Disclosure Bulletin, vol. 36 No. 09B Sep. 1993, Methodology for Automated Printed Selection, Salahsh et al., Sep. 1993.*

* cited by examiner

Primary Examiner—Gabriel Garcia
(74) Attorney, Agent, or Firm—Blakely Sokoloff Taylor & Zafman

(57) ABSTRACT

A virtual printer for print jobs printed on networked printers. First, the virtual printer checks a user's preferences regarding a print job the user wishes to send such as speed and image quality. Next, the virtual printer determines, using a server, database or other query, the most appropriate printer complying with the print job preferences, and located physically near the user and sends the print job to that printer. If the printer returns an error signal, the virtual printer will determine a different printer which closely complies with the print job preferences and re-send the print job. If a busy signal is returned, the user will be given the choice of waiting or having the virtual printer automatically determine the next available appropriate printer. When the print job is complete, the user will be notified of the physical location of the printer where the print job was processed.

20 Claims, 5 Drawing Sheets

DIRECTING PRINT JOBS IN A NETWORK PRINTING SYSTEM

BACKGROUND OF THE INVENTION

1. Field of the Invention

The present invention relates to the field of computer peripherals. More specifically, the present invention relates to the networking of printers.

2. Description of Related Art

Two types of printers—stand alone and networked—are currently available for computer systems and other devices utilizing hard copy output. The stand-alone printer is connected directly to a port of the computer system for which it is utilized and is often located physically near the computer system. Such a printer, though easy to monitor and control due to its proximity and direct connectivity to the computer system, cannot be shared. Historically, with a computer such as a mainframe or server, there has always been one printer or a single set of printers, somewhat remotely located which were shared by multiple clients connected to that mainframe or server. More recently as local area networks (LANs) and wide area networked (WANs) of many stand-alone computer systems (rather than dumb clients of a mainframe) became more commonplace, the networking of a single or single set of printers to service many computers at once became widespread.

In traditional networked printers, a single printer (or set of printers) is frequently connected through a central server which administered many different stand-alone computer systems. In other cases, where there is no central server, the individual workstations perform the server functions. The user of any one computer system must select the printer that they wish to use, or can be assigned a default printer during setup of the computer system by an administrator. In any case, the user can choose (or leave to a default) the printer used when sending a job over the network. The user also chooses all the parameters, such as print image quality, speed, color or black and white etc., after which the job is sent. If the print job is successful, the user can go to the printer and pick up the print job. However, if there is an error or the printer is busy processing a job from a second user, the user will be notified. Printer errors such as "Printer out of paper" are typical in the case of traditional so-called networked printers. At this point of error, the user either fix the printer error where the networked printer is located and adding paper in case of a "Printer out of paper" type message or cancel the current job and resend the job to a different printer.

Currently, there is no networked printer and/or server that will allow the user to merely select certain parameters of importance to the job, such as quality and speed without concern of which printer on the network will best suit his needs. Further current networked printers and print servers do not automatically re-route jobs to other printers when there is a printer error, nor keep track of and utilize the physical location of particular printers for the convenience of the user. When the user selects a printer on the network, he must know where that printer is and make decisions which the user should not need to make.

Thus, there is a need for offering a truly networked printer and server solution where the user needs choose only job-relevant parameters such as the quality, speed, dithering, etc. of the job and not have to choose which printer to print to. Further, when a printer error occurs, there is a need to automatically ensure that the job is printed without the user having to choose a different printer or figure out where the closest printer matching his job needs is located.

SUMMARY

The present invention is a networked printing solution which minimizes the necessity of user interaction in the printing process.

A virtual printer, as part of a client generating a print job, receives preferences from a user regarding the print job such as image quality and/or speed. The virtual printer automatically determines which printer of the printers on the network comply with the print job preferences. The virtual printer then selects an appropriate printer which complies with the preferences and is located physically near the user/client. The virtual printer sends the print job to the selected printer and waits until the job is complete before notifying the user that the print job is complete and of the location of the selected printer. If an error signal is returned by the selected printer, the virtual printer automatically selects a different printer closely complying with said preferences.

Alternatively, a server connected to the network may perform the computations necessary to select an appropriate printer. The server may also be capable of spooling the print job from the client. The server may also store and update databases cataloging the capability of printers on the network and keep the status of printers on the network. The server may also confirm a mapping of the physical locations of all printers and/or clients on the network.

DETAILED DESCRIPTION OF THE INVENTION

Figure 1:
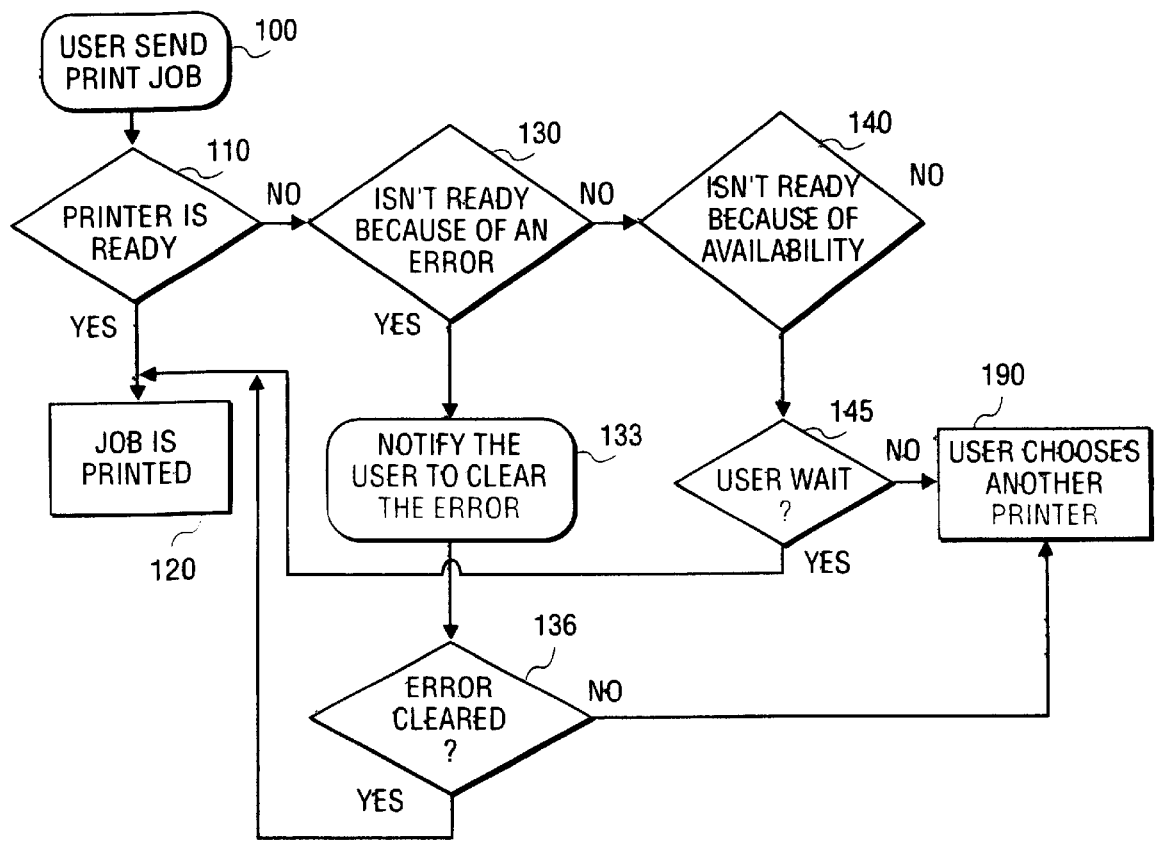
FIG. 1 is a flowchart of a print job on a traditional networked printer.

FIG. 1 is a flowchart of a print job managed on a traditional networked printer according to the prior art.

In the prior art of FIG. 1, at step 100, a user sends a print job to a printer which has been already chosen by the user or by a default setting. At step 100, the user has selected the parameters of the job such as the quality of the print job and consequently, the speed. It is typical for the operating system of the user's computer station or software from which the print job is generated to check whether the printer is ready for the print job to be processed and/or sent (step 110). If the printer is ready (has paper, is on-line and so on), then the job is printed (step 120). However, if the printer is not ready then two possibilities arise: 1) the printer is not ready because of an error (checked at step 130) or 2) the printer is not ready because of availability (checked at step 140). If the printer is not ready because of an error, then the software/printer notifies the user to clear the error (step 133) by the use of a message on the display of the user's computer, or an audio message output through the speakers of the user's computer. Next, the printer and/or software checks to see if the printer error has been cleared (step 136). If the error is cleared, then the job is printed (step 120). If the error is found not to be cleared, then the user must choose another printer (step 190), at which point the process of the user sending the print job begins anew (step 100), but using a new printer chosen by the user.

If the printer is not ready because of availability (checked at step 140), this typically indicates that another print job is on-going from the same or another user of the network. In this case, the user is asked if he wants to wait (step 145). If the user waits, then once all pending print jobs with a higher priority are completed by the printer, then the print job of this user is finally printed (step 120). However, if the user decides not to wait, he must choose another printer (step 190), at which point the process of the user sending the print job begins anew (step 100), but with a new printer which must be chosen by the user. In many networked printer systems, the user is forced to wait until the job is printed or until the user cancels the job and resets the choice of printer through either the application generating the print job or, as is often the case, a "chooser" or other networking manager which can change the printer to which the user's computer system is connected logically.

The problem with the traditional networked printer solution as shown in FIG. 1 is multi-faceted. The burdens on the user, whose only concern is that the job be printed and preferably in a closely located printer with a certain quality, are unnecessarily great. The user is forced to select a printer, and if that choice has been made by default, then upon an error, the user must either clear the error himself, which requires the user going to the location of the printer and fixing the error, or select yet another printer. The user having to clear the error himself is inefficient in terms of time usage in most contexts such as an office suite, especially where the user is not concerned with nor responsible for the proper functioning of the printer per se, but rather, that the printer successfully complete the print job. When selecting another printer, the user must know which available printers are capable of successfully processing his print job (for example, if the user needs a color print job, a black and white only printer is inadequate). Further, the user may unwittingly select a printer which is in a physical location distant from his station, though closer printers were available and capable of successfully and adequately processing the job. If a selected printer is not available, then the user must wait for the selected printer to become available even though another printer, unknown to the user, was available, at that time. Thus, the user is made to wait unnecessarily.

Further, on a client or shell which operates from a mainframe, the user must know which printers are available, and how they are accessed (device parameters) for the user to successfully choose another printer. In many platforms, such as UNIX, no error message from the printer may ever be returned to the user indicating that the job failed or that the printer is busy. Thus, when the user submits the "lpr" (line printer) command in a UNIX shell to print a document, the job may be sent but never successfully completed, and the user would have no way of knowing if the job was successful, or if the printer was ready, unless the user goes to the printer location and checks. Thus, there is need to reduce the amount of interaction between the physical printers on the network and the user sending a print job, such that, when a job is sent, a "virtual" printer automatically selects an appropriate printer, by querying and computing location, capability and availability. Further, when a printer has an error, the user should not be required to fix the error or manually select another printer but rather, should only have to pick up his print job when completed at the location specified on his computer and allow the printing system to perform the selecting of another printer.

Figure 2:
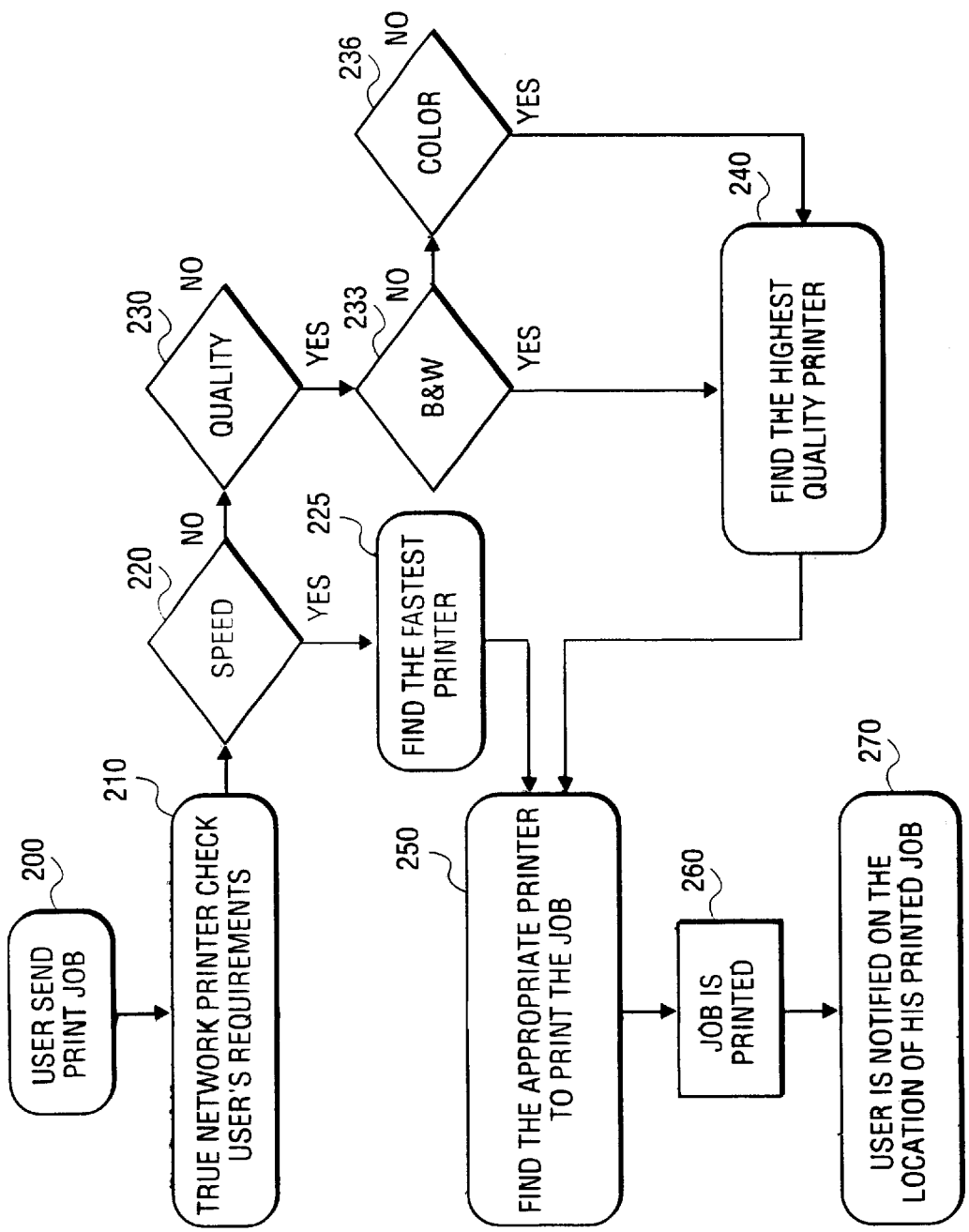
FIG. 2 is a flowchart of a print job on a network printer according to an embodiment of the present invention.

FIG. 2 is a flowchart of a print job on a network printer according to one embodiment of the present invention.

In sharp contrast to the methodology shown in FIG. 1, the user is relieved of many, if not all interaction with the printing process once the job is sent. At step 200, the user sends a print job to a printer which has already been chosen by a default setting or in the absence of a default, a "virtual" printer, according to the present invention. At step 200, the user has selected the parameters of the job such as the quality of the print job and the speed and whether the image should be in black and white or in color. Though speed and quality are inherently linked, with a higher quality leading to lower speed and a lower quality leading to a higher speed, the preferences are treated as separate. The speed preference of the print job refers not to the user's choice of the number of pages-per-minute precisely, but rather whether the job is a rush job or can wait for some time to guarantee that other print job preferences are complied with. If a high quality (letter as opposed to draft mode) image, with quality defined by the dots-per-inch (dpi) of the print image from the printer, is more important, then the speed preference may be sacrificed. The user's preferences, as shown in FIG. 2—quality, speed, color—are only exemplary of three of the many preferences possible for a print job such as paper type, paper size, dithering, and so on.

For the preferences shown as part of steps 220, 230, 233 and 236, the networked printer according to one embodiment of the present invention operates as follows. When the print job is being sent, the virtual printer, which is an extension of the operating system, or a server, checks the user's preferences (step 210). If speed is a preference of the user (checked at step 220), then the server or virtual printer will find out which printer out of all available printers is the fastest (step 225). Availability may be defined as all non-busy printers or as all printers that are networked regardless of their busy or free status. If speed is not a preference of the user (checked at step 220), then the server or virtual printer will, in this model, automatically default to knowing that high quality is a preference of the user (checked at step 230). Once quality of print image is determined to be a preference of the user, then the next question is whether or not the print image should be in black-and-white or color. If the print image is to be in black-and-white (checked at step 233) then, according to step 240, the server or virtual printer will find out which printer out of all available printers is the highest quality printer that prints in black and white. However, if the user prefers a color image that is of high quality (checked at step 236, but defaults at yes) then, at step 240, the server or software will find out which printer out of all available printers is the highest quality printer that can print in color.

Whatever the preferences—speed and quality—of the user, at step 250, the server or virtual printer automatically finds and selects the appropriate printer to print the job. The appropriate printer may be the printer that is physically located closest to the user and may also be, of the available printers, the printer which is not busy or the least busy. If at step 250 the highest quality printer, found at step 240, or the fastest printer, found at step 220, are currently busy then the server or virtual printer will seek out and find the next highest quality printer or the next fastest printer which is not busy. Likewise, in the case of a printer error, if either the highest quality printer or the fastest printer returns some error code, such as "out of paper", then, according to step 250, the server or software will find an available printer which is not busy and which does not return any error messages. Thus, the user is relieved of the burdens of trying to find or select the most appropriate printer for his job. The user has already selected the speed and quality at which his print job is preferably printed and there the user's burden ends. Once the appropriate printer is found to print the job, the job is printed at step 260. The user is then notified of the location of his printed job according to step 270. Thus, the user generating the print job needs only worry about the speed and/or quality or other preferences at which the job should be printed. Preferences can be set either by default or through a changing dialog box or menu, after which the user needs only to wait for the notification of where his print job was printed to.

In the embodiment illustrated by FIG. 2, speed and quality are shown as having yes or no values, however, it will be readily appreciated that the speed can be variable and have many values from which the user can choose, such as slow, slower, fast, fastest or medium. Likewise, the parameter of quality as shown in FIG. 2 can have many different values from which the user can choose such as letter or draft mode or even specifying, from a range of dpi, an exact dpi quality of his print image. Whatever the available options for speed and quality which are presented to the user, the most appropriate printers for each of the speed and quality settings, or even a combination of the two, will be found by the server or the software and does not need to be selected by user. Thus, if a fast job is preferred and a color job is also preferred, then only certain printers, which are both fast and can print in color, will be determined as among the appropriate printers to print the job. When finding the most appropriate printer to print a job the physical location of the printer in relation to user is an important factor. This ensures that the user will travel the shortest possible distance in order to pick up his print job once it is printed.

The virtual printer can be implemented as a stand-alone application or function call running from the software generating the print job or even an extension or add-in to the operating system of the computer generating the print job. In a server implementation, the server will have a print manager software capable of performing the computation necessary to find an appropriate printer. The virtual printer in a first embodiment will query a database containing information or all printers present in, for example, an office suite where the user works. This information will be device parameters including but not limited to the printer's speed, its color/grayscale/black-and-white capability, the types of paper it will accept and so on, and can be obtained from driver software supplied by the manufacturers of the printers or by a system administrator who knows the capabilities of the printer. The database of printer capability may be static or dynamic depending on the circumstances of the network in which it is employed. When finding the highest quality printer according to step 240 and/or the fastest printer according to step 225, the server/virtual printer operates as follows. The server or virtual printer reads data from the database of printer information and uses some sorting or indexing method to rank the printers according to speed or quality, whichever is required. The topmost rank of printer is passed to the function call or software of the virtual printer/server finding the "appropriate" printer according to step 250. By traversing through the list, starting with the topmost ranked printer, the server/virtual printer will query each printer for availability.

In another embodiment, the virtual printer/server will access a coordinate mapped list of the physical locations of each printer. The topmost ranked printer according to speed and quality will be indexed with the coordinate $(X_1, Y_1)$. The user or workstation generating the print job can also be identified by a coordinate location by accessing a similar coordinate map list for workstations, and has a coordinate $(X_2, Y_2)$. The distance between the topmost ranked printer and the user/workstation is determined by server/virtual printer computing the formula $\sqrt{(X_2-X_1)^2+(Y_2-Y_1)^2}$. If the second ranked printer is determined by the virtual printer/server to be equally or closely capable with the topmost ranked printer, then the distance of the second ranked printer (coordinate $(X_3, Y_3)$) is determined according to the formula $\sqrt{(X_3-X_2)^2+(Y_3-Y_2)^2}$. This distance is compared with the distance from the user to the topmost ranked printer to determine which of the two printers is most "appropriate" printer complying with the user's speed/quality preferences and closer than other printers of similar capability.

Each user or workstation may have a profile stored in the server or virtual printer which enables the server/virtual printer to decide how important distance to the printer is compared to speed/quality preferences. The case logic and artificial intelligence involved in determining which printer is most appropriate involves a combination of speed/quality and other job-related preferences with physical location (distance from the user), and can be implemented in a variety of methods and algorithms. A programmer/designer skilled in the art will readily be able to optimize the specific logic, algorithms and artificial intelligence to suit both the usage constraints of the network (how many total printers, total users, etc.) and the computing power/speed of the server or virtual printer. For instance, a list may be generated in advance for each combination of speed/quality and stored for access whenever the virtual printer/server requests it. Furthermore, all the lists and databases employed in finding the most appropriate printer may be dynamically updated or static for a set time. If an appropriate printer for each print job is busy or has an error, the query indexing and determining of appropriate printer will repeat with the busy or error laden printer eliminated from the computation. The busy/error/available status of each printer can be stored on the server or queried by the server/virtual printer as is required. Further, the error status such as out-of-paper can be forwarded to an administrator or other personnel responsible for clearing the printing error.

Figure 3:
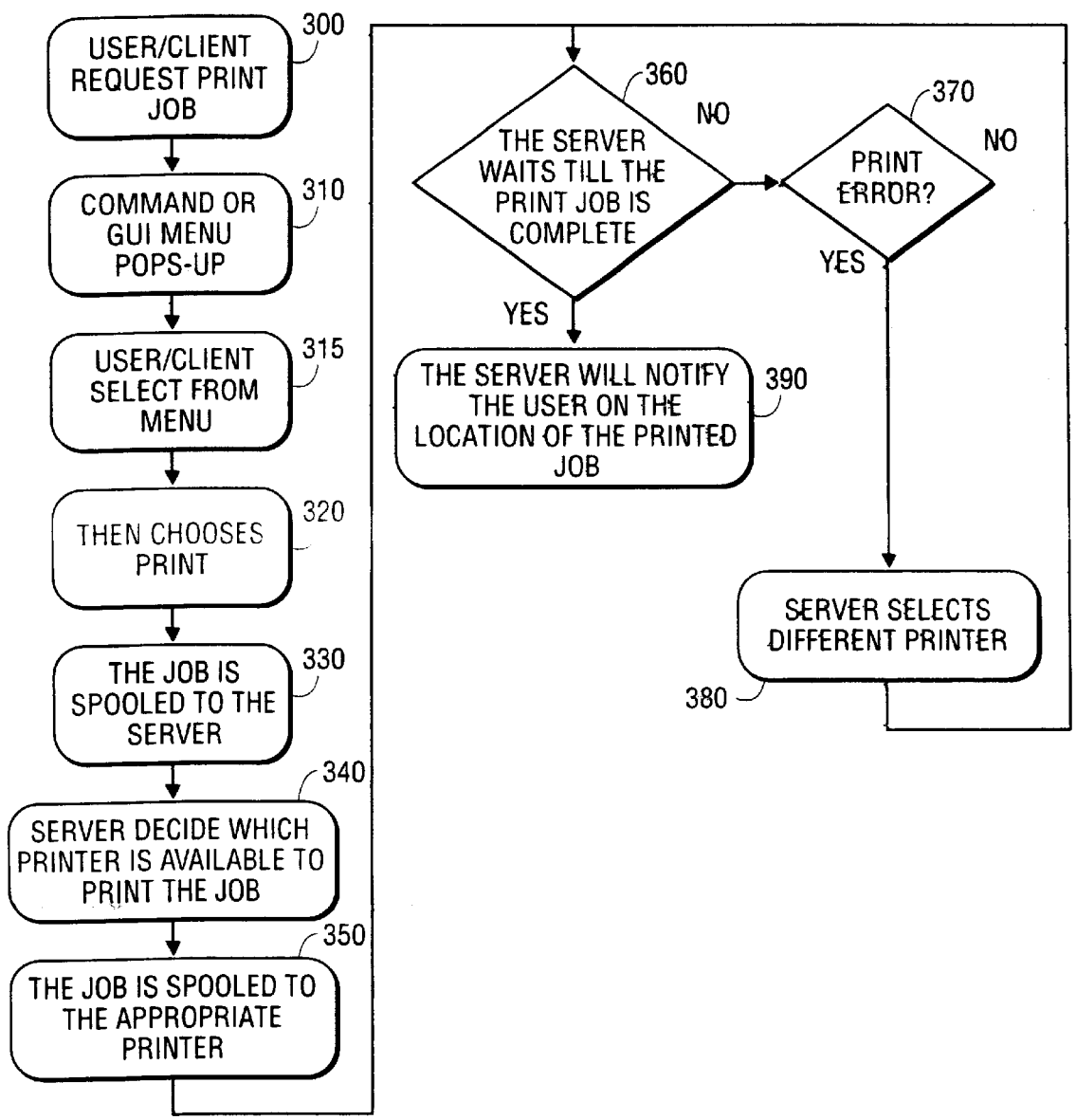
FIG. 3 is a flowchart of a print job on a network printer as submitted to a server according to an embodiment of the present invention.

FIG. 3 is a flow chart of a print job on a network printer as submitted to a server according to one embodiment of the present invention.

First, at step 300, the user or client requests a print job from his station or computer system. A print job may be requested by software or an application within the computer system of the user who selects a print command from the application. According to step 310, a command menu or graphical user interface (GUI) menu will pop up on the user's display screen as a dialog so that the user can select the parameters of his print job such as speed, quality and either color or black and white. Once a user or client has finished selecting all of the parameters of his print job from the menu at step 315, the user may then choose to print the job. Next, according to step 330, the print job is spooled to the server, The server will be capable of containing many such print jobs from different users and clients on the network. Once any job is spooled to the server, the server will decide which printer is available to print the job (step 340) using the user's preferences selected from the GUI or command menu. The user's preferences are also sent along with the actual print job to be printed when spooled to the server. The server will have a map of all available printers along with the status of each printer, such as busy or paper out which can be updated in a timely manner. Though not the focus of this invention, the server will also have a mapping of the physical location (coordinate map) of each of the printers on the network such that when the server decides which printer is available to print the job, the server can also take into account the physical location of the user and find the printer nearest to the user which complies with the print job preferences of the user. Once the appropriate printer is found, the print job is sent and spooled to that printer (step 350).

Since the job has been spooled to the server at step 330 the user or client's computer system or station is free to perform other tasks and does not have the ongoing print job clogging up or bottling up his system. According to step 360, the server waits until the print job is completed and is constantly checking to see whether or not the print job has been completed. This typically entails a control signal from the printer specifying that the job sent has already been printed. According to step 370 the server is also checking continuously for a print error message back from the printer. If a print error message is returned, then the server selects a different printer from the printers that are available. When the server selects a different printer, according to step 380, the server uses the same preferences that the user or client selected at his station for the print job relating to quality, speed and color or black and white for example. The preferences can all be stored in a user profile or even a print job profile for each individual print job. With a user profile, the server is capable, for each user or client on the network, of storing a default profile of what types of print jobs the user or client is most likely to request and how important location of print job is to the user. In step 380, it is the server, and not the user, that must select a different printer when a print error is returned and, once a different printer is selected, waits until the print job is complete. Once the print job is complete, according to step 390, the server will notify the user of the location of the printed job so that the user can pick up the printed job.

Figure 4:
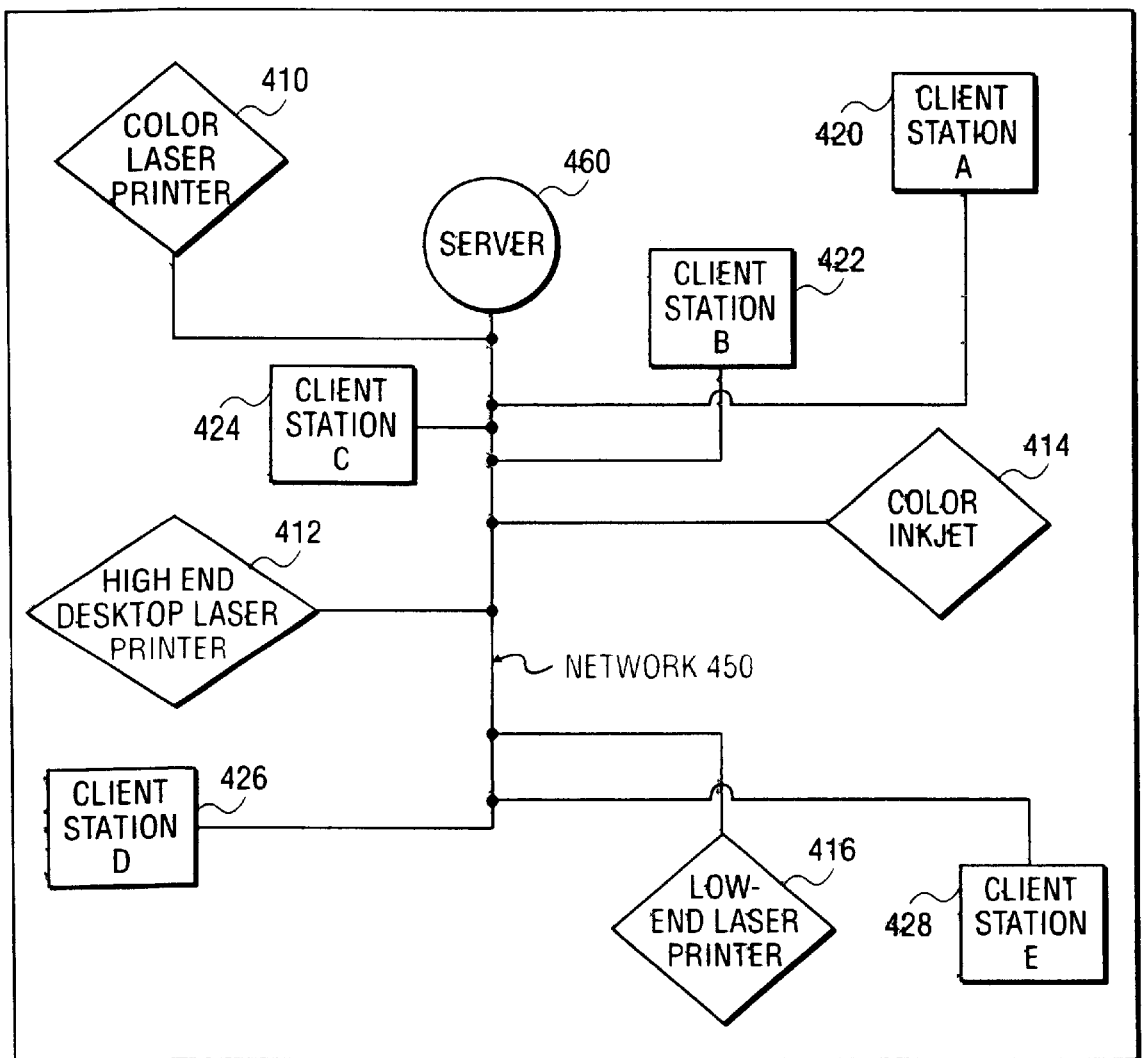
FIG. 4 is a diagram of an exemplary office suite with multiple client stations and printers.

FIG. 4 is a diagram of a typical office suite having four printers and a multitude of user client stations.

A network 450 which can be a LAN, WAN or other private network or even the Internet, connects together a server 460 along with five client stations and four printers. FIG. 4 shows the layout of an exemplary office suite 400 wherein each of the client stations can be analogized to the cubicle or office of employees working within that office suite. The office suite 400 has four printers: a color laser printer 410, a high-end desktop laser printer 412, a color ink jet 414 and a low-end printer 416. Also shown in FIG. 4 are five client stations—client station A 420, client station B 422, client station C 424, client station D 426 and client station E 428. A server 460 is connected by use of network 450 to the five client stations and the four printers contained within the office suite 400. Color laser printer 410 is capable of printing laser quality but color images in high resolution with the average color laser printer able to print up to six pages per minute (ppm). High-end desktop laser printer 412, on the other hand, is, in the example, only capable of printing a black and white image, or in the case of graphics, a gray-scale image, but at a high rate of speed such as on average 16 ppm. For example, the industry considers currently the Hewlett-Packard 5si (a product of Hewlett-Packard Corp.) laser printer to be a high-end desktop laser printer which has a capability of printing 24 ppm in black and white with between 600 dpi and 1200 dpi as the resolution or quality of the print image.

Color ink jet printer 414 is, in the example, a low-end color printer using ink jet technology and is meant primarily for the home user or the small office but is also common where, while color capability is required, high-end color such as laser color is not required. An example of a color ink jet printer such as color ink jet 414, is the Hewlett-Packard 660C (a product of Hewlett-Packard Corp.) color ink jet printer which can print at a resolution of 300 dpi in color, but also can print in a resolution of 600 dpi in black and white its highest quality mode. Further, such ink jet printers have the capability of handling a great variety of paper and media such as transparencies, labels and envelopes in contrast to most laser printers which is limited in the media it can print on. Finally, the exemplary office suite 400 also has a low-end laser printer 416 which in our example are laser printers capable of printing around 12 or fewer PPM in black-and-white. An example of such a low-end laser printer as low-end laser printer 416 is the Hewlett-Packard 5ML (a product of Hewlett-Packard Corp.) series of printers.

The printers 410, 412, 414 and 416 shown in exemplary office suite 400 may be capable of supporting different printer "languages" such as Postscript or Printer Control Language "PCL" which are control signal protocols which inform the printer of where to align its margins, when to perform line feeds or page breaks, what fonts to use, what size fonts to use and so on. Further, while some printers are capable of understanding one of the printer languages such as either Postscript or PCL but not both, a further print job preference may be the printer language which either the software/application used in generating the print job.

The printers shown in exemplary office suite 400 are all networked printers rather than direct-connect printers. A direct-connect printer is not capable of connecting over a network connection such as Ethernet and can only be connected directly to a port of a computer system. A network printer typically has the capability of being both directly connected to a particular computer and connected over network 650. Each of the client stations 420, 422, 424, 426 and 428 are capable of running applications or software which can generate print jobs from documents created within the application or software or exported into the application or software. In one embodiment of the present invention, server 460 may simply be a server which queries information regularly from all of the printers available and also keeps a mapping of the geographical location of the printers rather than acting to spool print jobs and calculating the appropriate printer to send the print job to.

In this embodiment, client station A 420, client station B 422, client station C 424, client station D 426 and client station E 428 all include operating system or hardware, a virtual printer mechanism which appears and acts like an actual printer to software and applications, but is in fact a printer daemon which can query and determine the most appropriate printer for a particular print job generated from its client station. The virtual printer will query the printer/server and receive status and/or mapping location information from the server for all of the printers in the office suite 400 such that the virtual printer can match the user's preferences provided to it with the capabilities as well as physical location of printers to find the most appropriate printer for the print job. The virtual printer can be invoked by the user submitting a print command from the software/application generating the print job or from the operating system. The virtual printer, when invoked, will bring up a menu or GUI dialogue allowing the user to select the preferences of the print job such as speed and quality before the print job is actually processed. Once the user has selected the parameters for his print job, the virtual printer performs all of the computation and logic necessary, shown in FIGS.

2 and 3, and thus, the user and client station are freed to perform other tasks. The virtual printer is capable of receiving error messages from an appropriate printer that it has found and then changing its choice of appropriate printer by re-querying the server and re-computing to find the next most appropriate printer.

In the first example, a user on client station A 420 generates a print job using application or software which runs on client station A 420. When a print command is invoked from the application/software which generated the print job, through use of the operating system, on client station A 420, the virtual printer brings up a dialogue or menu checking for the user's preferences. A menu or dialogue box (described below) will appear allowing the user to select between speed and quality and color or black and white. If the user chooses a single preference that the print job be printed in the fastest possible manner because of the great number of pages involved in the print job perhaps then the virtual printer will use this requirement and query the server 460 to find that the highest speed printer available is the high-end desktop laser printer 412. Since quality is not an issue in this particular example, color laser 410 will not be selected by the server 460 as the appropriate printer since its page per minute capability is only around six PPM. Once the virtual printer has queried the server 460 or high-end desktop laser printer 412 and finds that the high-end desktop laser printer 412 is available, then the virtual printer sends the print job over the network 450 to be processed on high-end desktop laser printer 412. If high-end desktop laser printer 412 is full of paper and not busy, then the print job will be processed on high-end desktop laser printer 412.

Once the print job is completed on high-end desktop laser printer 412, high-end desktop laser printer 412 will send a control signal back to the virtual printer on client station A 420 informing it that the job is completed. The virtual printer then displays a message using the same GUI as the preferences menu or different GUI notifying the user of client station A 420 that the print job has been completed and can also notify the user of the physical location of high-end desktop laser printer 412 such that he may go pick up the print job. If however, after submitting the print job by the virtual printer, the high-end desktop laser printer was out of paper and returned an error message to client station A 420 informing it that it is out of paper, then the virtual printer on client station A 420 would again query the server or otherwise compute to find the next available highest speed printer connected to network 450. Since quality is not a preference of the user, a black-and-white image is assumed and since low-end laser printer 416 has a greater ppm capability than either the color ink jet 414 or the color laser printer 410, which are both capable of black and white but perhaps at lower speed, the virtual printer on client station A 420 will select low-end laser printer 416 as its next choice of appropriate printer.

Again if low-end laser printer 416 is available and not busy, the print job will be resent to low-end laser printer 416 without requiring any action/prompting from the user of client station A 420. Likewise, if high-end desktop laser printer 412 upon initially receiving a request from the virtual printer to process the print job on client station A 420 was busy processing a print job from client station D 426 then a busy signal is returned by the high-end desktop laser printer 412 over network 450 to client station A 420 such that the virtual printer on client station A 420 can select another printer. Further, in the circumstance where high-end desktop laser printer 412 returns a busy signal to client station A 420, the user may be notified with a further dialogue box notifying him that high-end desktop laser printer 412 is busy and ask the user whether or not to wait for his print job to be completed at that printer or, in the alternative, whether to have the virtual printer select another printer instead.

In another example, assuming that speed is not a primary preference of the user at client station A 420, then the dialogue box will also contain a range of image quality which the user may select as preferred. If the user prefers a detailed graphical image then the next question will be whether or not that image will be in black-and-white (or gray-scale) or in color. If a high quality color image is required then the virtual printer would first find that color laser printer 410 is the most appropriate printer in terms of quality for the job. In case the color laser printer 410 has an error or is busy and the user will settle for less image quality then the next selection by the virtual printer would be color ink jet 414, which while not having the resolution of color laser printer 410, may have the capability to print at a faster rate and also have the capability, unlike color laser printer 410 to utilize a different paper type, such as a transparency used in an overhead projector. Thus another preference which the user at a client station may select is the paper type. For certain paper types, laser printers may be wholly inappropriate whereas ink jet printers, though perhaps slower than black-and-white and with less detailed resolution than color, are still most appropriate because of the medium on which the print job is to be processed.

Server 460 will, according to one embodiment of the present invention, also store/generate a coordinate map list of the physical locations of all printers in the office suite 400 as well as the physical locations of each of the client stations A through E such that in the case of two printers complying with the user's preferences, the printer nearest in physical location to the user at his client station can be selected. The coordinate mapping may select a corner of the office as an origin and grid the entire office so that each station or printer has unique coordinates. Thus, if a user at client station E 428 submits a print job requesting merely a color image without regard to its specific quality then either color laser printer 410 or color ink jet 414 may fit this preference. However, by using the location mapping on server 460, the virtual printer/server may compute that, based on the distance of client station E 428 relative to color laser printer 410 and color ink jet 414, that color ink jet 414 is the printer closest in physical location to the user at client station E 428. Therefore, the virtual printer, upon determining that color ink jet 414 is in fact the closest printer will select color ink jet 414 as the appropriate printer and send the job to color ink jet 414 for processing. Upon completion of the job, the user at client station E 428 will find that his print job was successfully completed in a location close to him such that he does not have to travel far to pick up his print job. Without this functionality, and in the traditional case of networked printer solutions, the user at client station E 428 must select which printer the print job is sent to. If the user at client station E 428 is unaware of the distance at which color laser printer 410 is located and the fact that color ink jet 414 is also capable of producing the print image for the job that he has sent, then the user at client station E 428 may unwittingly select the color laser printer 410 which is farther in location. Thus, in this embodiment of the present invention, the user does not need to know or determine where the printers are located, what their capabilities are, or which one is busy or does not have an error and can successfully complete the print job—the user is relieved of all such burdens.

Figure 5:
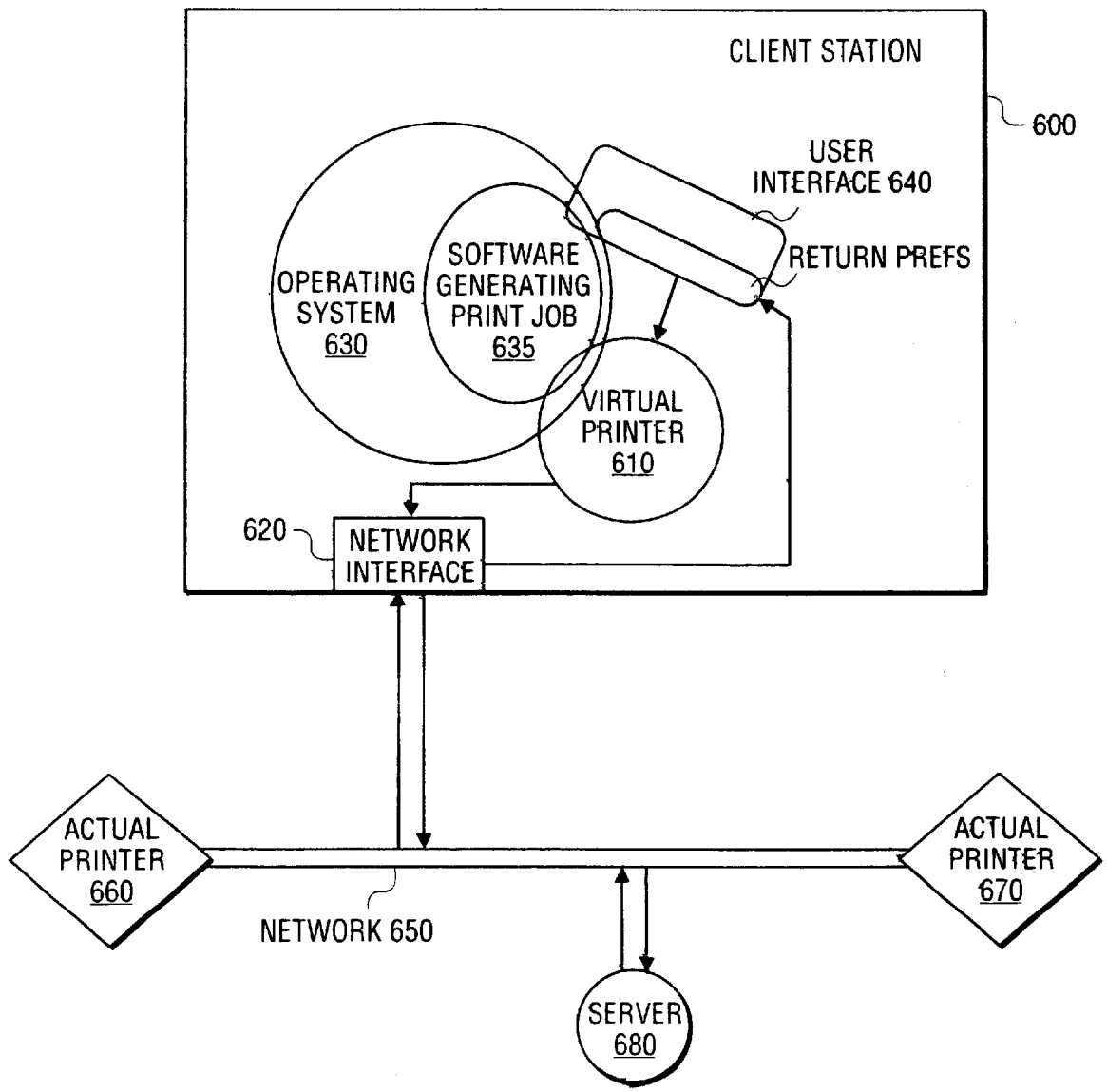
FIG. 5 is a logical diagram of the components of the present invention.

FIG. 5 is a logical diagram of components of an embodiment of the present invention.

A client station 600 is a computer system or other electronic device capable of producing printed output such as a PDA. An operating system 630 is the underlying platform which runs the software and can, in some cases, manage hardware within the system and peripherals connected to the system. A software 635 is the software generating a print job such as Microsoft Word™ (a product of Microsoft Corp.) which produces a print job such as a letter or report that the user wants printed. The software 635 runs over the operating system 630 and receives data from the operating system in connection with a virtual printer 610 so that the virtual printer 610 is transparent to software 635. Virtual printer 610 is a virtual device recognized by the operating system to be the printer device, but is in fact, only a print daemon which interfaces with network 650 through network interface 620. Virtual printer 610 is software, hardware, firmware or a combination thereof which is pre-programmed to communicate with operating system 630, network 650 and printers or servers running on network 650 as well as software 635.

As mentioned earlier, network 650 may be a LAN, WAN, wireless network or the network of networks referred to as the Internet. As shown in FIG. 5, the virtual printer 610 can be part of or a separate function call invoked from operating system 630 and invoked/communicating to software 635 which generates the print job. A user interface 640 can be a function of the operating system 630 or software 635 which "pops-up" on a display or other output device allowing the user of client station 600 to select the print job preferences.

The software 635 running under operating system 630 generates a print job. When the user of client station 600 activates the print command from software 635, the operating system 630 and/or the software 635 will generate the user interface 640 so that the user can select the preferences of the print job such as quality and speed. The user interface 640 returns preferences to virtual printer 610 once the user has selected them. In one embodiment of the present invention, virtual printer 610 communicates with server 680 over network 650 using network interface 620, which is a modem and/or interconnect combined with communicating software or protocol managers. Virtual printer 610 inquires of server 680 the status of the printers on the network, such as actual printer 660 and actual printer 670 as to whether they are busy or available. Virtual printer 610 also queries server 680 for a mapping of the physical location of actual printers 660 and 670 and computes which is the closest to client station 600. Virtual printer 610 receives other data, from the server 680 or a database in client 600, such as the capabilities of the printers so that the virtual printer can find the most appropriate printer, one that complies with the user's print job preferences. Virtual printer 610 may be implemented as software, hardware, firmware or a combination thereof.

Once virtual printer 610 has found an appropriate printer, virtual printer 610 sends the print job to that printer. If the print job is printed successfully, a signal will be returned over network 650 by that printer indicating which printer the job was printed on to virtual printer 610. Virtual printer 610, through use of user interface 640 or a new user interface notifies the user of the location of the print job using the mapping obtained from server 680.

If, however, an error signal indicating a busy printer is received, then the virtual printer acting through operating system 630 and/or software 635 will bring up another user interface or use the user interface 640 to allow the user the choice of waiting or asking the virtual printer to find an available printer that is not busy. If the user wants the job printed immediately and does not want to wait for the selected appropriate printer to finish its previous job, virtual printer 610 will once again query the server and determine an other appropriate printer.

Rather than a busy signal, if the printer returns an error signal such as "out of paper", the virtual printer will locate another appropriate printer and re-send the job without any prompting required from the user.

In another embodiment, the virtual printer 610 forwards the print job as well as the user's preferences to server 680. The server 680 performs all the computation and logic to find the most appropriate printer for the job and interacts with virtual printer 610 and client station 600 only to inform the user of the location of the print job or to ask the user whether the user wants to wait or wants the server to find another printer capable of printing the print job. By spooling the print job to server 680, client station 600 and operating system 630 are relieved of the burden on resources of managing a print job and of computing which printer is the most appropriate printer. Once server 680 has determined the appropriate printer (FIG. 5 shows actual printers 660 and 670, but more are possible), the print job is spooled from server 680 to that printer. When the print job is complete, the server informs the user of client station 600 through network 650, network interface 620 and user interface 640.

Many alternate embodiments of the present invention are possible, depending upon the needs and requirements of the machine to be administered, and the embodiment described above is merely an embodiment.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a network having a client which generates a print job, a printing system comprising:

a virtual printer coupled to said client, said virtual printer configured to determine which printer of a plurality of printers on the network complies with print job preferences, said virtual printer receiving said preferences of said print job from said client, wherein said preferences include at least one of print image quality, speed of said print job, color/black-and-white image, paper type and paper size;

a first printer coupled to said virtual printer and to said network, wherein said virtual printer determines that said first printer complies with said preferences, said virtual printer automatically forwarding said print job to said first printer, after automatically forwarding said print job to said first printer, said virtual printer receives a signal from said first printer indicating that said print job cannot be completed, said virtual printer terminating said print job on said first printer, said virtual printer determining that a second printer at least partially complies with said preferences, said virtual printer automatically forwarding said print job to said second printer, and said virtual printer notifies said client of a physical location of said completed print job.

2. A printing system according to claim 1 further comprising a database coupled to said virtual printer cataloging the capabilities of printers on said network.

3. A printing system according to claim 1 further comprising a server coupled to said network and storing a database cataloging the capabilities of printers on said network, said server coupled to said virtual printer to enable said virtual printer to access said database.

4. A printing system according to claim 2 wherein said database catalogs a user profile in which user-specific preferences are stored.

5. A printing system according to claim 1 wherein said preferences include the distance from and location of said actual printer in relation to said client.

6. A printing system according to claim 1 wherein said preferences include color images and black-and-white images of said print job.

7. A printing system according to claim 1 wherein said signal includes a printer busy signal.

8. A printing system according to claim 7 further comprising a dialog coupled to said client to enable a user to select continuing processing of said print job on said first printer upon said printer busy signal being cleared rather than processing said print job on said second printer.

9. A printing system according to claim 1 wherein said signal includes an out-of-paper signal.

10. In a network connecting a plurality of clients with a server, said clients generating print jobs, a printing system comprising:

a virtual printer coupled to each client, said virtual printer configured to determine which printer of a plurality of printers on the network complies with print job preferences, said virtual printer receiving preferences of a print job generated by the client to which the virtual printer is coupled, said virtual printer communicating said preferences to said server and transferring said print job generated by the client to said server wherein said preferences include at least one of print image quality, speed of said print job, color/black-and-white image, paper type and paper size; and a first printer coupled to said network and to said server, wherein when said virtual printer determines that said first printer complies with said preferences, said virtual printer automatically forwards said print job to said first printer, wherein after said server receives a signal from said first printer indicating that said print job cannot be completed, said virtual printer terminating said print job on said first printer, said virtual printer determining that a second printer complies at least partially with said preferences, said virtual printer automatically forwards said print job to said second printer, and said virtual printer notifies said client of a physical location of said completed print job.

11. A printing system according to claim 10 further comprising a database stored and updated on said server, said database cataloging the capabilities of printers on said network.

12. A printing system according to claim 10 further comprising a database stored and updated on said server, said database cataloging the status of printers on said network.

13. A printing system according to claim 11 wherein said database catalogs user profiles in which user-specific preferences are stored.

14. A printing system according to claim 10 further comprising a database stored and updated on said server, said database maintaining a location mapping of printer on said network.

15. A printing system according to claim 10 wherein said preferences include the distance and location of said first printer in relation to said client generating said print job.

16. A printing system according to claim 10 wherein said signal includes printer busy signal.

17. A printing system according to claim 10 wherein said signal includes an out-of-paper signal.

18. A printing system according to claim 16 further comprising a dialog coupled to said client to enable a user to select continuing processing of said print job on said first printer upon said printer busy signal being cleared rather than processing said print job on said second printer.

19. A method of managing a print job in a network having a plurality of printers, said method comprising the steps of:

checking preferences of a user regarding said print job;

invoking a virtual printer to determine a first printer from the plurality of printers that complies with said preferences;

automatically sending said print job to said first printer;

notifying said user of the physical location of said first printer and notifying said user that said print job has been completed, upon said first printer successfully completing said print job, said steps of checking, determining and sending are repeated for a second printer if said second printer complies at least partially with said preferences, and if the previously determined first printer cannot complete said print job; and wherein said preferences include one of print image quality, speed of said print job, color/black-and-white image, paper type and paper size.

20. A method of managing a print job in a network environment having a plurality of printers and a server, said method comprising the steps of:

checking preferences of a user regarding said print job;

spooling said print job to said server;

invoking a virtual printer to determine a first printer from said plurality of printers that complies with said preferences;

automatically sending said print job to said first printer;

notifying said user of the physical location of said first printer and notifying said user that said print job has been completed, upon said first printer successfully completing said print job, said steps of checking, spooling, and determining are repeated for a second printer if said second printer complies at least partially with said preferences, and if the previously determined first printer cannot complete said print job; and wherein said preferences include one of print image quality, speed of said print job, color/black-and-white image, paper type and paper size.

* * * * *